US006254843B1

(12) United States Patent
Brown et al.

(10) Patent No.: US 6,254,843 B1
(45) Date of Patent: Jul. 3, 2001

(54) PROCESS FOR THE RECLAMATION OF CALCIUM SULFITE PRODUCED BY A CALCIUM-BASED FGD SYSTEM

(75) Inventors: Gregory N. Brown, Palmyra; Michael L. Mengel, Fredericksburg, both of PA (US)

(73) Assignee: Marsulex Environmental Technologies, LLC, Lebanon, PA (US)

( * ) Notice: Subject to any disclaimer, the term of this patent is extended or adjusted under 35 U.S.C. 154(b) by 0 days.

(21) Appl. No.: 09/443,814

(22) Filed: Nov. 19, 1999

(51) Int. Cl.[7] .................................................... B01D 53/50
(52) U.S. Cl. ................................ 423/243.08; 423/243.09; 423/555
(58) Field of Search ........................ 423/243.08, 243.09, 423/555, 243.01

(56) References Cited

U.S. PATENT DOCUMENTS

| | | | |
|---|---|---|---|
| 5,266,287 | * 11/1993 | Johnson | 423/243.08 |
| 5,695,727 | * 12/1997 | College et al. | 423/235 |
| 6,090,357 | * 7/2000 | Hammer et al. | 423/210 |

FOREIGN PATENT DOCUMENTS

| | | | |
|---|---|---|---|
| 288 100 A5 | * 3/1991 | (DE) | 423/243.09 |
| 62-225226A | * 10/1987 | (JP) | 423/243.08 |
| WO 89/07576 | * 8/1989 | (WO) | 423/243.08 |

OTHER PUBLICATIONS

U.S. Application No. 08/335,589, Laslo.

* cited by examiner

Primary Examiner—Steven P. Griffin
Assistant Examiner—Timothy C Vanoy
(74) Attorney, Agent, or Firm—Gary M. Hartman; Domenica N. S. Hartman

(57) ABSTRACT

A method of producing calcium sulfate with a flue gas scrubbing facility having a gas-liquid contactor that uses a calcium-based slurry to absorb sulfur dioxide from a flue gas containing acidic gases, wherein a byproduct containing calcium sulfite precipitate is produced that is accumulated in a reservoir, such as a pond, apart from the gas-liquid contactor. Such a facility is modified to produce calcium sulfate by installing an acidifier vessel and an oxidation receptacle in series between a source of the flue gas and the gas-liquid contactor. The flue gas containing the acidic gases is caused to flow through the acidifier vessel, into which the byproduct is delivered from the reservoir so that some of the acidic gases of the flue gas are absorbed by the byproduct and the pH of the byproduct is sufficiently lowered to allow the calcium sulfite precipitate to dissolve in the byproduct. The flue gas from the acidifier vessel is then delivered to the gas-liquid contactor where sulfur dioxide is absorbed by the calcium-based slurry, and the byproduct from the acidifier vessel is accumulated in the oxidation receptacle. Within the oxidation receptacle, the calcium sulfite dissolved by the byproduct is oxidized to produce calcium sulfate, which is then removed from the oxidation receptacle.

9 Claims, 1 Drawing Sheet

PROCESS FOR THE RECLAMATION OF CALCIUM SULFITE PRODUCED BY A CALCIUM-BASED FGD SYSTEM

BACKGROUND OF THE INVENTION

1. Field of the Invention

This invention generally relates to methods of reclaiming large amounts of calcium sulfite, as is produced by lime-based flue gas desulfurization (FGD) systems. More particularly, this invention is directed to a process and equipment capable of being retrofitted to an existing FGD facility at minimal cost and with minimal interruption of the existing scrubbing operation, and which efficiently converts the stock of calcium sulfite produced by the FGD facility to calcium sulfate.

2. Description of the Prior Art

A significant number of facilities exist that produce and/or store large amounts of calcium sulfite. Primary examples are lime-based flue gas desulfurization (FGD) systems that remove substances such as acidic constituents and particulate matter from combustion or flue gases produced by utility and industrial plants. Limebased flue gas desulfurization processes have typically involved the use of limestone (calcium carbonate; $CaCO_3$) slurries or hydrated lime (calcium hydroxide; $Ca(OH)_2$) slurries formed by action of water on lime (calcium oxide; CaO). Intimate contact between these calcium-based slurries and acidic gases that are present in flue gases, such as sulfur dioxide, hydrogen chloride (HCl) and hydrogen fluoride (HF), result in the absorption of the gases by the slurry and the formation of salts, such as calcium sulfite ($CaSO_3 \cdot \frac{1}{2}HOH$), calcium sulfate ($CaSO_4 \cdot 2HOH$), calcium chloride ($CaCl_2$) and calcium fluoride ($CaF_2$) precipitates, which must be collected for disposal, recycling or sale.

Calcium sulfite is the primary byproduct of lime-based FGD operations, but has no commercial value and is difficult to dispose of. In contrast, calcium sulfate (gypsum) is a saleable byproduct, is significantly easier to handle, and can be more readily stored long-term. In more modern FGD facilities, scrubber units are adapted for in situ forced oxidation of the slurry (typically within the gas-liquid contactor) to ensure that all of the sulfites are reacted to form sulfates, thereby maximizing the production of gypsum. However, many existing facilities are not equipped for in situ forced oxidation, and as a result accumulate large amounts of calcium sulfite slurry that is typically stored for long periods in holding ponds prior to disposal. During storage, calcium sulfite can leach into the surrounding soil, posing a hazard to plant life and ground water. As a result, processes have been proposed for reclaiming and converting calcium sulfite in holding ponds. One such method utilizes a liquid source of acid that is introduced into a storage tank into which the slurry is pumped. An amount of acid is added to sufficiently lower the pH of the mixture to enable the sulfite precipitate to become dissolved in the mixture, which is then aerated with compressed air to oxidize the calcium sulfite and produce calcium sulfate. This type of system is expensive to operate, primarily due to the cost of the acid when compared to the value of the final sulfate product.

In view of the above, it would be desirable if a method were available that was practical for reclaiming and converting calcium sulfite slurry accumulated from lime-based flue gas scrubbing operations that do not have the capability for in situ oxidation. To be practical, such a method must be capable of being adapted for use with existing FGD facilities without requiring major renovations to the existing FGD scrubber units, capable of being installed and commenced with minimal interruption of the scrubbing process, and operate without the necessity for adding an additional acidification agent.

SUMMARY OF THE INVENTION

The present invention provides a process and appropriate equipment that can be added to an existing flue gas scrubbing facility to reclaim accumulated calcium sulfite slurry and produce calcium sulfate. The invention is particularly suitable for retrofitting an existing facility that scrubs sulfur dioxide-containing flue gases, as is typical with plants that burn fossil fuels. Such facilities typically employ a gas-liquid contactor to absorb sulfur dioxide from the flue gases, producing a calcium sulfite-containing slurry that is accumulated or otherwise held in a reservoir apart from the gas-liquid contactor. The calcium sulfite within the slurry is in precipitate form, has essentially no commercial value, and is difficult to store and dispose of.

A flue gas scrubbing facility modified in accordance with this invention generally includes a vessel through which acidic gases flow, and to which the calcium sulfite-containing slurry is delivered from the reservoir so that an amount of the acidic gases is absorbed by the slurry to lower the pH of the slurry to a level sufficient to enable the sulfite to dissolve. The acidic gases required to acidify the calcium sulfite-containing slurry are preferably drawn from the combustion source of the flue gases intended for treatment by the existing facility, which are then delivered to the gas-liquid contactor of the same facility for scrubbing, such that the overall acid emission level from the combustion source is reduced. After contacting and absorbing the acidic gases, the slurry is accumulated in a receptacle where the calcium sulfite dissolved in the slurry is oxidized and converted to calcium sulfate. The calcium sulfate precipitates can then be removed from the receptacle for sale or storage.

Based on the above, the present invention provides a method by which a large amount of accumulated calcium sulfite can be safely and efficiently reclaimed from a lime-based flue gas scrubbing operation that does not have the capability for in situ oxidation. Furthermore, the method and its associated equipment are readily capable of being adapted for use with an existing FGD facility without requiring major renovations to the FGD scrubber unit, and can be installed and commence operation with minimal interruption of the scrubbing process.

Other objects and advantages of this invention will be better appreciated from the following detailed description.

BRIEF DESCRIPTION OF THE DRAWINGS

The present invention will now be described, by way of example, with reference to FIG. 1, which is a schematic representation of a flue gas scrubbing facility configured in accordance with the present invention.

DETAILED DESCRIPTION OF THE PREFERRED EMBODIMENT

Figure 1:
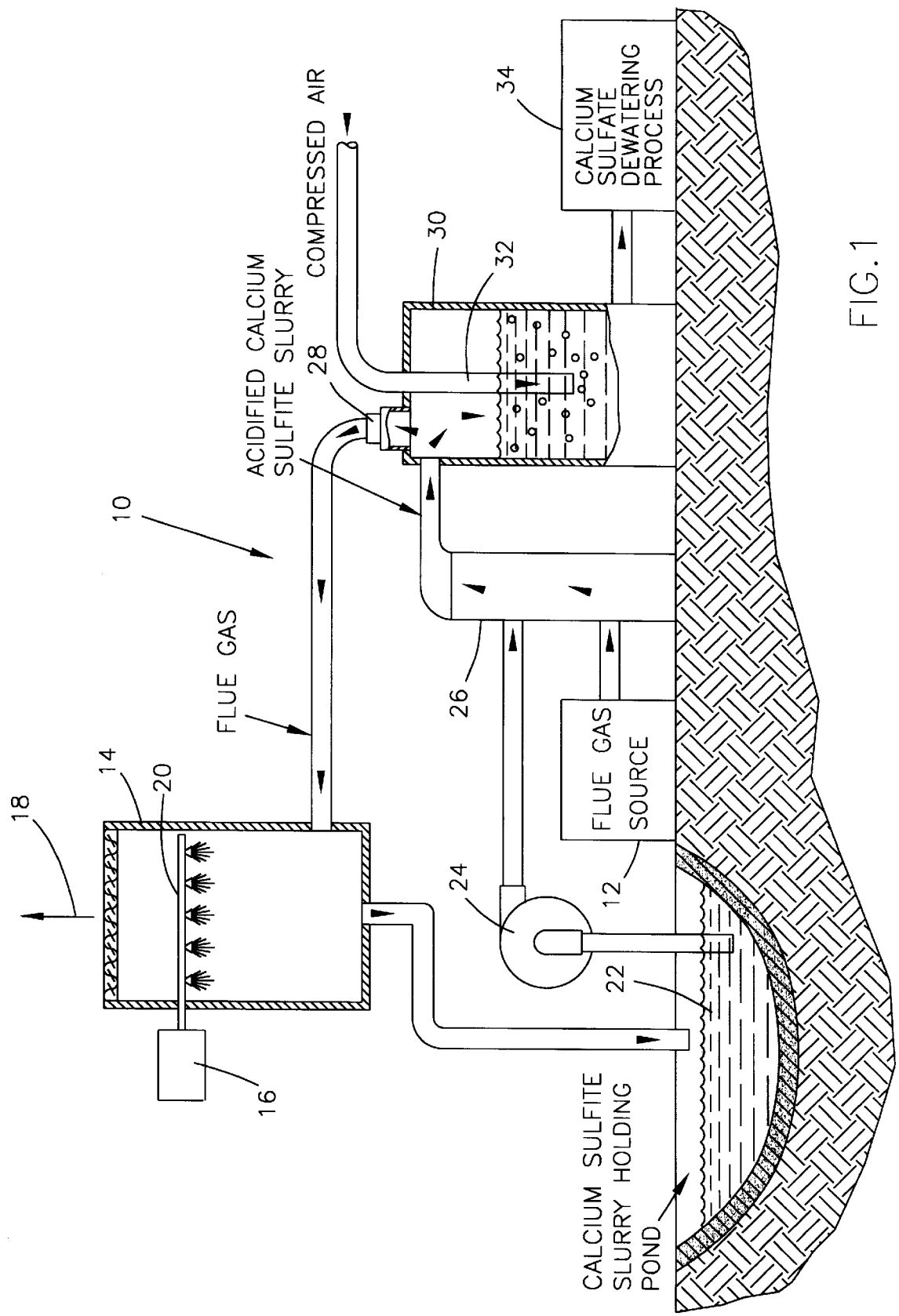

FIG. 1 schematically illustrates a flue gas scrubbing facility 10 that has been retrofitted in accordance with the teachings of this invention. The facility 10 is generally of the type that scrubs flue gases produced by the burning of fossil fuels, and as a result contain acidic gases such as sulfur dioxide, hydrogen chloride, and/or hydrogen fluoride. The conventional components of the facility include a combustion source 12 for the flue gases and a gas-liquid contactor 14 that employs a calcium based slurry 16 to scrub the flue gases, which are then released to atmosphere through appropriate equipment, including a chimney 18. The slurry 16 is shown as being introduced into the contactor 14 with spray nozzles 20, though other suitable delivery devices could be used. As with many existing flue gas scrubbing facilities, the contactor 14 represented in FIG. 1 is not equipped for in situ forced oxidation of the slurry within the contactor 14, but instead accumulates the spent slurry, referred to here as a byproduct laden with calcium sulfite precipitate, in a holding pond 22. During storage, the calcium sulfite in the byproduct can leach into the surrounding soil, posing a hazard to plant life and ground water.

According to the present invention, the hazard posed by the pond 22 is alleviated by continuously removing the byproduct from the pond 22, and converting the calcium sulfite precipitate within the byproduct to calcium sulfate, which is a saleable product that is also less hazardous to handle and store. The byproduct is shown as being drawn from the pond 22 with a pump 24 that delivers the byproduct to a vessel, generally referred to herein as an acidifier 26, which operates as a second gas-liquid contactor of the facility 10. As seen from FIG. 1, at least some and possible all of the flue gases from the combustion source 12 are routed to the acidifier 26, where it is contacted by the byproduct so that acidic gases (e.g., sulfur dioxide, hydrogen chloride and hydrogen fluoride) are absorbed by the byproduct. A sufficient amount of acidic gases is absorbed such that the pH of the byproduct is lowered to the extent necessary for the calcium sulfite precipitates in the byproduct are dissolved.

As depicted in the Figure, the acidifier 26 has a relatively small cross-section so that the flue gases flow upward through the acidifier 26 at a relative high speed, preferably about 45 to 70 feet per second (about 14 to 21 m/s), in order to completely entrain and deliver the byproduct to an oxidation tank 30. Gas-liquid contactors specifically configured to entrain a contact liquid or slurry are disclosed in U.S. patent application Ser. No. 08/335,589 and U.S. Pat.No. 6,090,357 to Hammer et al., commonly assigned with this invention and incorporated herein by reference. While the ability of the acidifier 26 to completely entrain the byproduct is preferred on the basis of operating efficiency, it is foreseeable that the byproduct could be allowed to collect in the bottom of the acidifier 26, and then be pumped to the oxidation tank 30. From the acidifier 26, the flue gases, now partially scrubbed by the byproduct, flows through a separation device 28 before being delivered to the gas-liquid contactor 14, where the scrubbing operation is completed with the calcium-based slurry 16.

Within the oxidation tank 30, the byproduct, now containing dissolved calcium sulfite, is oxidized to convert the calcium sulfite to calcium sulfate. As shown in FIG. 1, the byproduct is preferably introduced at the top of the tank 30, and compressed air is introduced with a sparger 32 into the byproduct near the bottom of the tank 30. As a result, the sparged air migrates upward toward the surface of the byproduct within the tank 30 as the byproduct introduced at the top of the tank 30 settles toward the bottom of the tank 30. As this occurs, oxygen within the air oxidizes the dissolved calcium sulfite, generating calcium sulfate precipitate. The reaction is a continuous process as more byproduct is introduced at the top of the tank 30 and more air is introduced near the bottom of the tank 30, where crystals of calcium sulfate are removed by any suitable dewatering system 34.

While our invention has been described in terms of preferred embodiments, it is apparent that other forms could be adopted by one skilled in the art. Accordingly, the scope of our invention is to be limited only by the following claims.

What is claimed is:

1. A method of producing calcium sulfate with a flue gas scrubbing facility having a gas-liquid contactor that uses a calcium-based slurry to absorb sulfur dioxide from a flue gas containing acidic gases and produce a byproduct containing calcium sulfite precipitate, the byproduct then being accumulated in a reservoir apart from the gas-liquid contactor, the method comprising the steps of:

installing an acidifier vessel and an oxidation receptacle between a source of the flue gas and the gas-liquid contactor;

flowing the flue gas containing the acidic gases through the acidifier vessel;

delivering the byproduct from the reservoir to the acidifier vessel so that some of the acidic gases are absorbed by the byproduct and the pH of the byproduct is sufficiently lowered to dissolve the calcium sulfite precipitate in the byproduct;

delivering the flue gas from the acidifier vessel to the gas-liquid contactor where sulfur dioxide is absorbed by the calcium-based slurry;

accumulating the byproduct from the acidifier vessel in the oxidation receptacle;

oxidizing the calcium sulfite dissolved by the byproduct within the oxidation receptacle to convert the calcium sulfite to calcium sulfate; and removing calcium sulfate from the oxidation receptacle.

2. A method according to claim 1, wherein the reservoir in which the byproduct is accumulated is an in-ground holding pond.

3. A method according to claim 1, further comprising the steps of producing the flue gas with a fossil fuel combustion apparatus, and then delivering the flue gas from the fossil fuel combustion apparatus to the acidifier vessel.

4. A method according to claim 1, wherein the byproduct is introduced into the oxidation receptacle above the byproduct accumulated in the oxidation receptacle, and an oxygen-containing gas is introduced at a lower end of the byproduct accumulated in the oxidation receptacle.

5. A method according to claim 1, wherein the flue gas flows upward through the acidifier vessel at a rate sufficient to entrain the byproduct and deliver the byproduct to the oxidation receptacle.

6. A method according to claim 1, wherein some but not all of the acidic gases contained in the flue gas are absorbed by the byproduct in the acidifier vessel.

7. A method according to claim 1, wherein oxygen is not injected into the byproduct prior to the byproduct being accumulated in the reservoir.

8. A method according to claim 1, wherein the installing step comprises retrofitting the flue gas scrubbing facility to include the acidifier vessel, the oxidation receptacle, means for delivering the byproduct from the reservoir to the vessel, and means for delivering the byproduct from the vessel to the receptacle.

9. A method according to claim 1, wherein the acidifier vessel and the oxidation receptacle are in series between the source of the flue gas and the gas-liquid contactor, so that the flue gas flows from the acidifier vessel to the oxidation receptacle and then to the gas-liquid contactor.

* * * * *